(12) United States Patent
Nakagome

(10) Patent No.: US 9,234,995 B2
(45) Date of Patent: Jan. 12, 2016

(54) ILLUMINATING DEVICE INCLUDING LENS ARRAYS AND DISPLAY WITH ILLUMINATING DEVICE INCLUDING LENS ARRAYS

(71) Applicant: TOPPAN PRINTING CO., LTD., Taito-ku (JP)

(72) Inventor: Tomohiro Nakagome, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 14/291,288

(22) Filed: May 30, 2014

(65) Prior Publication Data

US 2014/0340930 A1 Nov. 20, 2014

Related U.S. Application Data

(63) Continuation of application No. PCT/JP2012/081147, filed on Nov. 30, 2012.

(30) Foreign Application Priority Data

Dec. 1, 2011 (JP) ................. 2011-263465

(51) Int. Cl.
*F21V 7/04* (2006.01)
*F21V 8/00* (2006.01)

(52) U.S. Cl.
CPC .............. *G02B 6/0025* (2013.01); *G02B 6/003* (2013.01); *G02B 6/0031* (2013.01); *G02B 6/0036* (2013.01); *G02B 6/0053* (2013.01); *G02B 6/0055* (2013.01)

(58) Field of Classification Search
CPC .................................... G02B 6/0036
USPC ........................................... 362/607
See application file for complete search history.

(56) References Cited

U.S. PATENT DOCUMENTS

2003/0184993 A1* 10/2003 Yamada ............. 362/31

FOREIGN PATENT DOCUMENTS

| JP | 01-241590 | 9/1989 |
|---|---|---|
| JP | 2011-134560 | 7/2011 |

OTHER PUBLICATIONS

International Search Report issued Mar. 5, 2013 in PCT/JP2012/081147 filed Nov. 30, 2012 (with English Translation).

* cited by examiner

*Primary Examiner* — Anh Mai
*Assistant Examiner* — Hana Featherly
(74) *Attorney, Agent, or Firm* — Oblon, McClelland, Maier & Neustadt, L.L.P.

(57) ABSTRACT

An illuminating device includes one or more light sources that output light, a translucent light guide member having one or more side surfaces and a light output surface, and a lens sheet positioned over the light output surface of the light guide member and including a first array of lenses and a second array of lenses extended in directions intersecting each other. The light source is positioned to have an optical axis substantially in agreement with a normal direction of the side surface of the translucent light guide member, and the first array or the second array of the lenses which is extended in a direction substantially orthogonal to the optical axis of the light source has a surface area in a range of from 20% to 50% with respect to a total surface area of the first and second arrays of the lenses.

20 Claims, 10 Drawing Sheets

| | LUMINANCE | VIEW ANGLE | SIDELOBE |
|---|---|---|---|
| FIRST EXAMPLE | 230 cd/m² | ○ | ○ |
| SECOND EXAMPLE | 262 cd/m² | ○ | ○ |
| FIRST COMPARATIVE EXAMPLE | 216 cd/m² | ○ | × |
| SECOND COMPARATIVE EXAMPLE | 234 cd/m² | × | × |

ILLUMINATING DEVICE INCLUDING LENS ARRAYS AND DISPLAY WITH ILLUMINATING DEVICE INCLUDING LENS ARRAYS

CROSS-REFERENCE TO RELATED APPLICATIONS

The present application is a continuation of International Application No. PCT/JP2012/81147, filed Nov. 30, 2012, which is based upon and claims the benefits of priority to Japanese Application No. 2011-263465 filed Dec. 1, 2011. The entire contents of these applications are incorporated herein by reference.

TECHNICAL FIELD

The present invention relates to: light guide members and lens sheets, which are mainly used for control of an illuminated light path; illuminating devices equipped with these elements; and displays.

BACKGROUND ART

Japanese Patent Laid-Open No. H01-241590 describes printed white dots used as light deflection elements formed on the light deflection surface.

SUMMARY OF INVENTION

According to one aspect of the present invention, an illuminating device includes one or more light sources that output light, a translucent light guide member having one or more side surfaces into which the light is incident from the light source and a light output surface through which the light guided in the translucent light guide member is output, and a lens sheet positioned over the light output surface of the light guide member and including a translucent base, a first array of lenses, and a second array of lenses, the first and second arrays of lenses being mounted on the translucent base and extended in directions intersecting each other. The light source is positioned to have an optical axis substantially in agreement with a normal direction of the side surface of the translucent light guide member, and the first and second arrays of the lenses are formed such that one of the first and second arrays of the lenses which is extended in a direction substantially orthogonal to the optical axis of the light source has a surface area in a range of from 20% to 50% with respect to a total surface area of the first and second arrays of the lenses.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
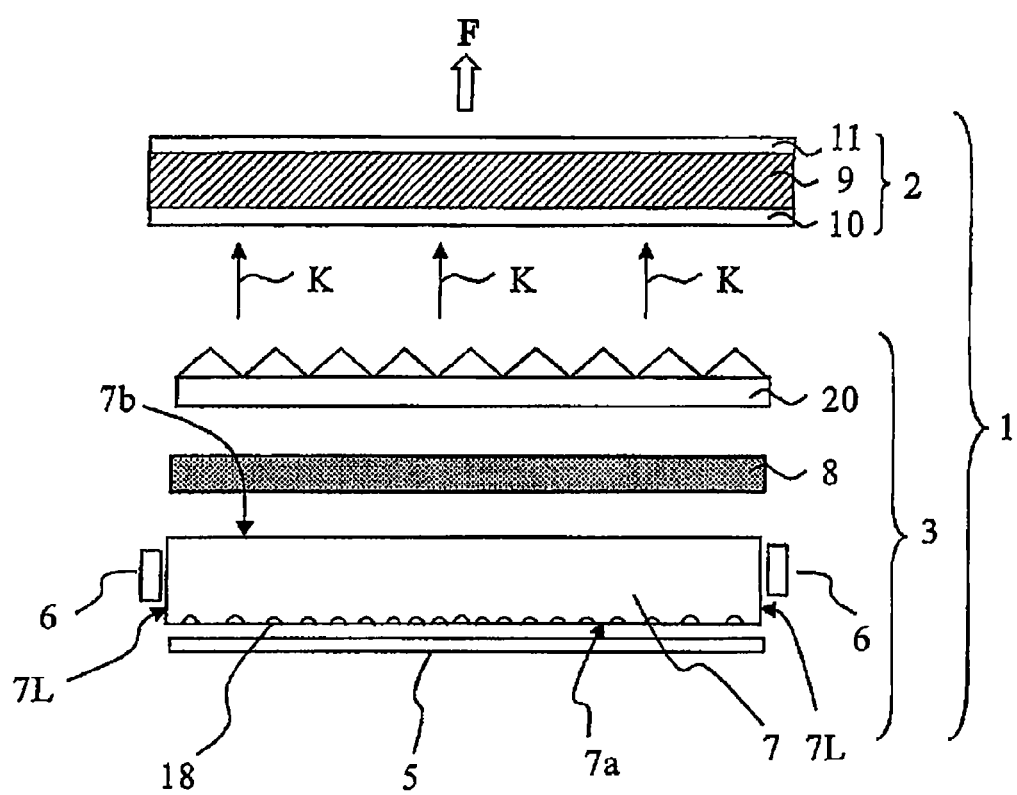
FIG. 1 is a schematic cross sectional view of a display according to one embodiment of the present invention.

The embodiments will now be described with reference to the accompanying drawings, wherein like reference numerals designate corresponding or identical elements throughout the various drawings.

FIG. 1 is a schematic sectional view of an illuminating device 3 equipped with a light guide member 7 according to an embodiment of the present invention, and a display 1 equipped with the illuminating device 3; each portion therein represented in a smaller scale does not coincide with an actual portion.

The display illustrated in FIG. 1 is comprised of an image display device 2, and the illuminating device 3 facing a light incident side of the image display device 2.

The illuminating device 3 is comprised of at least a lens sheet 20, a diffusion sheet 8, a light guide member 7, light sources 6, and a reflection sheet 5, which are located on the light incident side of the image display device 2.

One or more light sources 6 are so located at a position facing each incident end surface 7L of the light guide member 7 as to be parallel to an extending direction, i.e. a depth direction of FIG. 1. As the light sources 6, point light sources such as LEDs (Light Emitting Diodes) can be used. As the LEDs, white LEDs, RGB-LEDs composed of three primary color chips (red, green, and blue chips), or the like can be used. Fluorescent lamps, such as CCFL (Cold Cathode Fluorescent Lamps), can be used as the light sources 6. In FIG. 1, one light source 6 is located with respect to each of the opposing end surfaces 7L of the light guide member 7 as an example, but one or more light sources 6 can be located with respect to one end surface thereof. The light guide member 7 has a flat plate-like shape illustrated in FIG. 1, but can have a wedge shape or the like.

The light guide member 7 has a second major surface 7b at a viewer's side F, and a first major surface 7a opposite to the second major surface 7b. Light incident from the light sources 6 is deflected by the first major surface 7a so as to be output from the second major surface 7b. Specifically, the first major surface 7a serves as the light deflection surface 7a, and the second major surface 7b serves as the light output surface 7b. On the light deflection surface 7a, light deflection elements 18 are formed. The light deflection elements 18 are operative to deflect incident light from the light sources 6 toward the output surface 7b. Printed white diffuse-reflection dots are for example used as the light deflection elements 18. As another example, the light deflection elements 18 can have the shape of concave or convex microlenses or the shape of pyramids. There are known a plurality of approaches to form these shapes, for example, a transfer approach using dies or molds, an approach of forming them using a laser beam, and an approach of forming them using photolithography.

Figure 2:
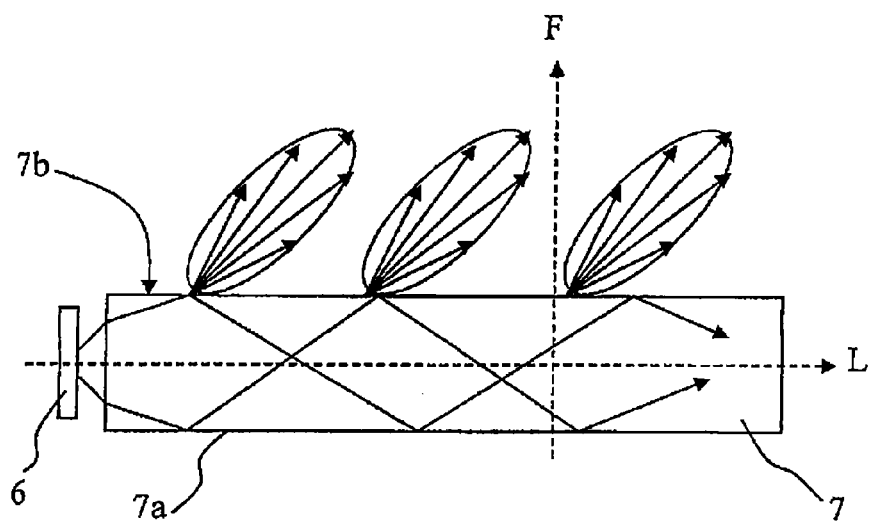
FIG. 2 is a view illustrating output light from a light guide member.
Figure 3:
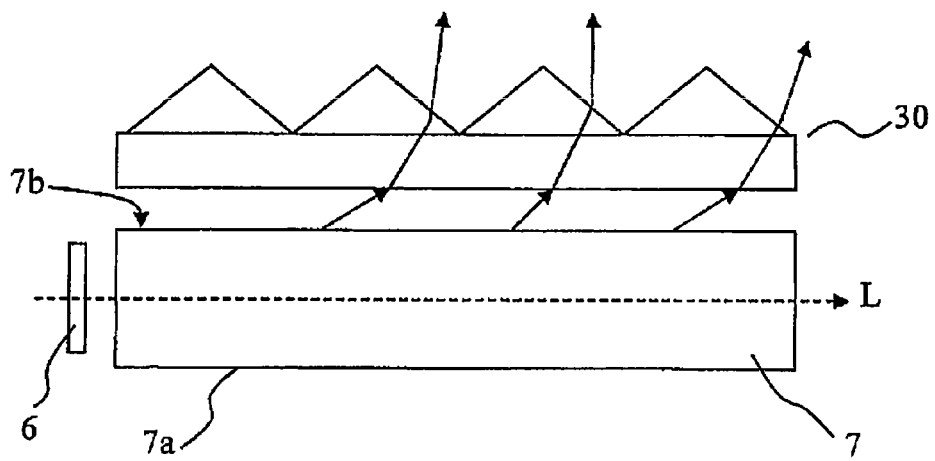
FIG. 3 is a view illustrating deflection of light by a lens sheet.
Figure 4:
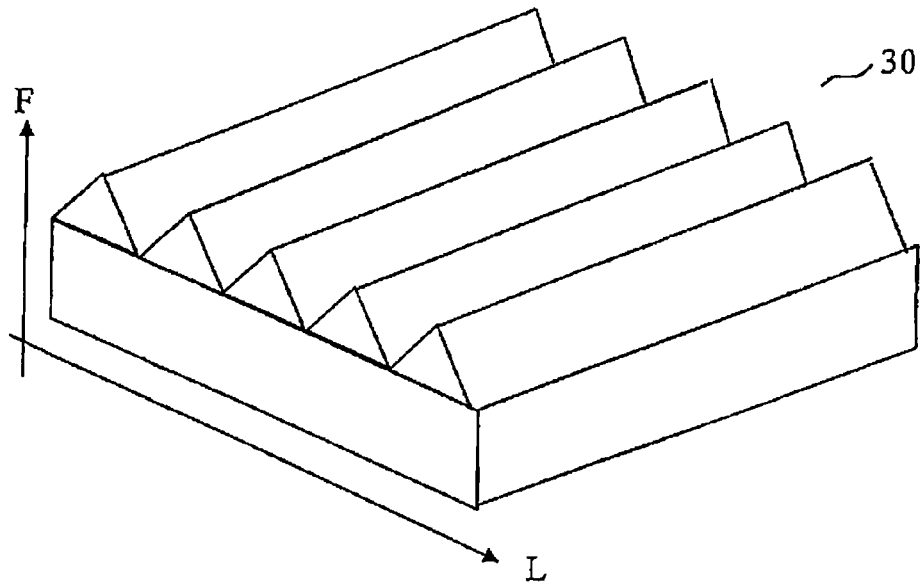
FIG. 4 is a perspective view of a prism sheet.
Figure 5:
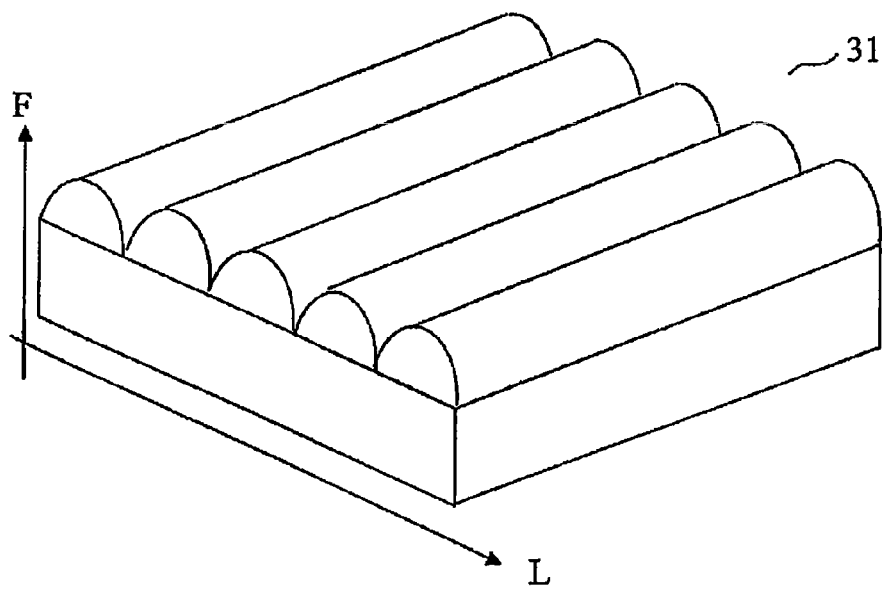
FIG. 5 is a perspective view of a lenticular lens sheet.

Light output from the light output surface 7b of the light guide member 7 has a light-intensity peak in an oblique direction inclined with respect to the direction of the viewer's side F. Specifically, FIG. 2 shows that light is output to be tilted toward an optical axis L of the light source 6. Note that, in order to simply demonstrate the behavior of light, FIG. 2 illustrates that the light source 6 is located on only one side of the light guide member 7, and the light deflection elements 18 are eliminated in illustration. In order to effectively deflect the output light, which has a light-intensity peak in the oblique direction, to the viewer's side F, as illustrated in FIGS. 3 to 5, it is desired to locate a prism sheet 30 or a lenticular sheet 31 at the viewer's side F of the light guide member 7. The prism sheet 30 or the lenticular sheet 31 has lenses extending in the direction orthogonal to the optical axis L of the light source 6.

However, it is necessary for the illuminating device 3 to be installed in the display 1 to deflect output light to the viewer's side F to increase luminance at the viewer's side F while being designed in consideration of the visual field of the display 1. Specifically, the display 1, as typified by a liquid crystal TV, needs to sufficiently ensure the horizontal visual field of its screen in comparison to the vertical visual field of its screen. Thus, the illuminating device 3 to be installed in the display 1 is usually designed to narrow the vertical visual field of the screen to increase luminance at the viewer's side F while widening the horizontal visual field of the screen.

As described above, in recent scanning backlights for 3D, the illuminating device 3 is divided into multiple illuminating devices 3 in the vertical direction of the screen according to scanning of video images. Turning on and turning out of the illuminating devices 3 are successively scrolled from the top thereof corresponding to the top of the screen to the bottom thereof corresponding to the bottom of the screen. This requires location of the light source 6 at each of the right and left sides of the screen. That is, the optical axis L of each of the light sources 6 is in agreement with the horizontal direction of the screen. This causes light output from the light guide member 7 to become oblique light that has a light-intensity peak in an oblique direction respect to the normal inclined toward the horizontal direction of the screen. In order to deflect such oblique light to the viewer side, it is desired to locate the prism sheet 30 or the lenticular sheet 31 that extends in the vertical direction of the screen. However, the prism sheet 30 or the lenticular sheet 31, which extends in the vertical direction of the screen has a function of narrowing the horizontal visual field of the screen to thereby increase luminance at the viewer's side F. For this reason, the aforementioned structure cannot obtain the desired visual fields set forth above. Particularly, because the prism sheet 30 may generate sidelobes, a diffusive optical sheet need be mounted on the prism sheet 30.

A lens sheet 20 constituting the illuminating device 3 according to an embodiment of the present invention is comprised of a translucent base, a first array of lenses, and a second array of lenses. The first lens array is mounted with respect to one surface of the base, and the lenses of the first array extend in one direction. The second lens array is mounted with respect to the surface, and the lenses of the second array extend in another direction intersecting the lenses of the first array. The lens sheets will be described in detail hereinafter with reference to FIG. 6 and following some figures.

Figure 6:
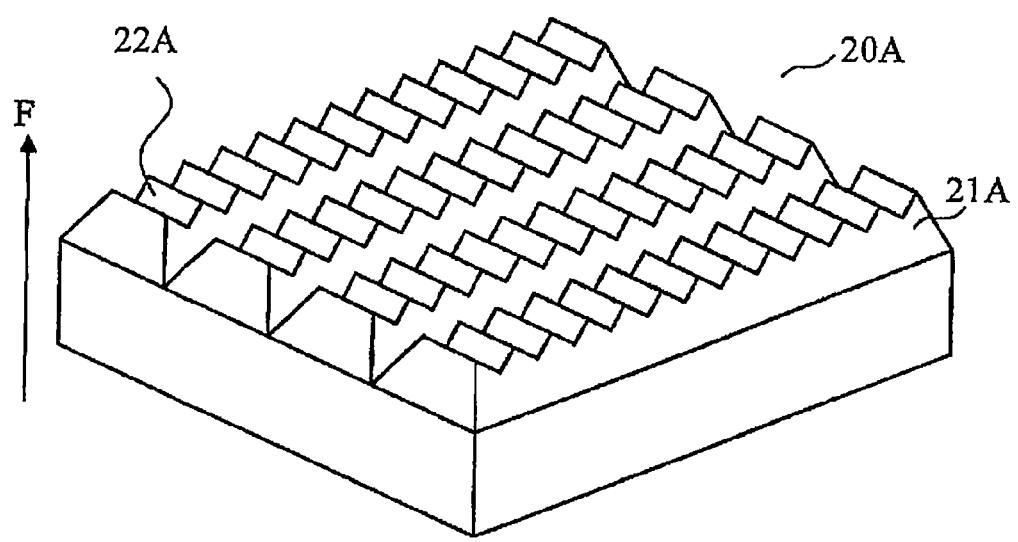
FIG. 6 is a perspective view of a lens sheet according to an embodiment of the present invention.

A lens sheet 20A illustrated in FIG. 6 is comprised of a first lens array 21A, i.e. a first array 21A of lenses, and a second lens array 22A, i.e. a second array of lenses 22A. The lenses of the first array 21A extend in a direction. The lenses of the second array 22A are smaller in size than those of the first array 21A, and extend in a direction substantially orthogonal to the extending direction of those of the first array 21A. Note that the arrangement that the extending direction of the lenses of the first array 21A is substantially orthogonal to the extending direction of those of the second array 22A means that an intersection angle between the extending direction of the lenses of the first array 21A and the extending direction of those of the second array 22A is within the range of 90 degrees plus or minus 10 degrees. The lenses of the first array 21A have a trapezoidal prism shape, and the lenses of the second array 22A have a triangular prism shape. The lenses of the second array 22A are formed on the top of each lens of the first array 21A, so that the top of each lens of the first array 21A also corresponds to the top of the second lens array 22A.

The extending direction of the lenses of the first array 21A or the lenses of the second array 22A is substantially orthogonal to the optical axis L of the light source 6. Note that the arrangement that the extending direction of the lenses of the first array 21A or the lenses of the second array 22A is substantially orthogonal to the optical axis L of the light source 6 means that an intersection angle between the extending direction of the lenses of the first array 21A or the lenses of the second lens array 22A and the optical axis L of the light source 6 is within the range of 90 degrees plus or minus 10 degrees. The lens array, which extends in a direction substantially coinciding with the extending direction of the incident end surface 7L of the light guide member 7, collects output light obliquely inclined, toward the optical axis L, with respect to a direction orthogonal to the optical axis L, and deflects the output light inclined toward the optical axis L to the viewer's side F.

The trapezoidal prism array 21A, which serves as the first lens array 21A, has an apex angle being preferably set within the range from 70 to 110 degrees inclusive. The apex angle of the trapezoidal prism array 21A, in other words, the apex angle of a trapezoidal prism of the array 21A, which is set within the range from 70 to 110 degrees inclusive, is preferable in collection of light incident to the lens sheet 20A and in increase of luminance on the viewer's side F. If the apex angle of the trapezoidal prism array 21A was set to be lower than 70 degrees, large sidelobes might be generated, resulting in reduction of luminance. If the apex angle of the trapezoidal prism array 21A was set to be greater than 110 degrees, the light collection capability might be reduced while the light output angle might be wide, resulting in reduction of luminance. Note that the apex angle of a trapezoidal prism of the array 21A is defined as an apex angle of a triangular shape formed by extending the oblique sides of the trapezoidal prism.

The triangular prism array 22A, which serves as the second lens array 22A, has an apex angle being preferably set within the range from 70 to 110 degrees inclusive. The apex angle of the triangular prism array 22A, in other words, the apex angle of a triangular prism of the array 22A, which is set within the range from 70 to 110 degrees inclusive, is preferable in collection of light incident to the lens sheet 20A and in increase of luminance on the viewer's side F. If the apex angle of the triangular prism array 22A was set to be lower than 70 degrees, large sidelobes might be generated, resulting in reduction of luminance. If the apex angle of the triangular prism array 22A was set to be greater than 110 degrees, the light collection capability might be reduced while the light output angle might be wide, resulting in reduction of luminance. The shape of a triangular prism of the array 22A is smaller than that of a trapezoidal prism of the array 21A, and the top of the trapezoidal prism array 21A is in common with that of the triangular prism array 22A.

The lens sheet 20A according to an embodiment of the present invention is comprised of the first lens array 21A and the second lens array 22A individually formed as lens arrays, respectively; the configuration easily controls two-directional view-angle characteristics thereof. Specifically, reduction of the width of the top of the trapezoidal prism 21A increases the percentage of the trapezoidal prism array 21A in the surface area of the lens sheet 20A, resulting in improvement of the light collection capability of the trapezoidal prism array 21A. On the other hand, an increase, in size, of the top of the trapezoidal prism 21A increases the percentage of the triangular prism array 22A in the surface area of the lens sheet 20A, resulting in improvement of the light collection capability of the triangular prism array 22A.

Figure 11:
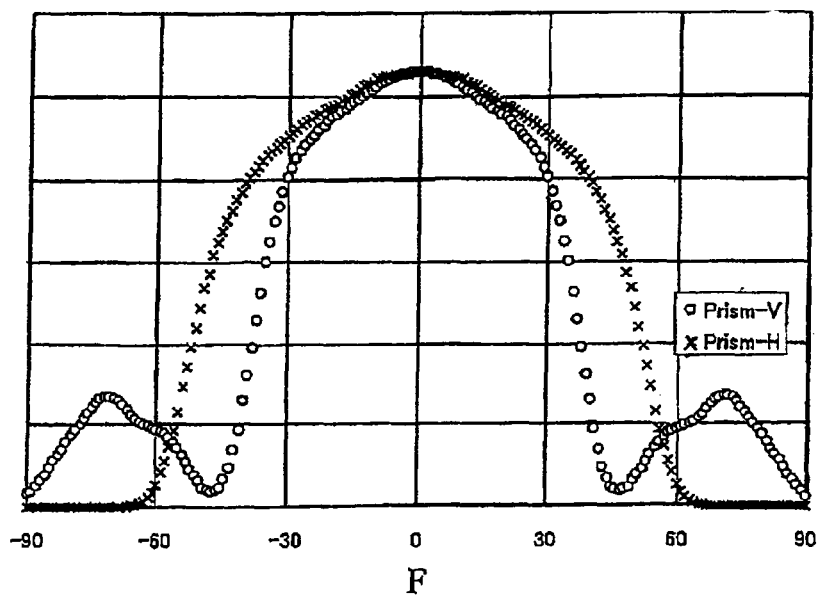
FIG. 11 is a chart illustrating an output-light distribution of a prism sheet.
Figure 12:
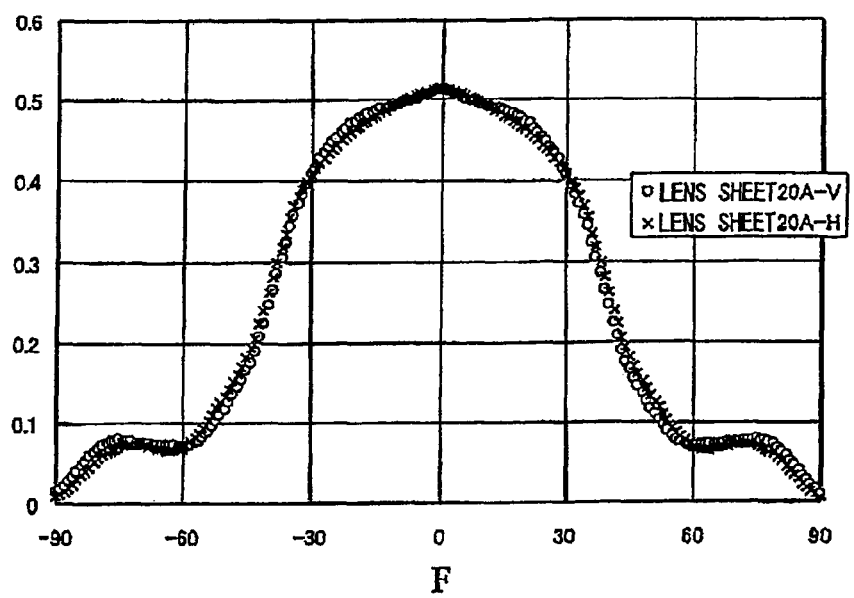
FIG. 12 is a chart illustrating an output-light distribution of a lens sheet according to an embodiment of the present invention.

A conventional triangular prism sheet or a trapezoidal prism sheet having an apex angle substantially lower than 100 degrees may generate sidelobes. Sidelobes are peaks generated separately from the peak of collected light in the viewer's side F, resulting in dark visual field between the peak of collected light in the viewer's side F and each of the sidelobes. The lens sheet 20 according to an embodiment of the present invention is comprised of the trapezoidal prism array 21A having the apex angle set within the range from 70 to 110 degrees inclusive, and the triangular prism array 22A having the apex angle set within the range from 70 to 110 degrees inclusive. This configuration generates no sidelobes. View-angle characteristics of a prism, plotted by circles in FIG. 11, show characteristics (V) in a direction orthogonal to the extending direction of the prism, and view-angle characteristics of the prism, plotted by crosses in FIG. 11, show characteristics (H) in the extending direction of the prism. Thus, because the lens sheet 20A is comprised of the first lens array 21A and the second lens array 22A, it is possible to compensate for their light-collection functions with each other. That is, it is possible to obtain the light intensity distribution corresponding to the sum of the characteristics (V) in the direction orthogonal to the prism illustrated in FIG. 11, and the characteristics (H) in parallel to the prism illustrated in FIG. 11. Thus, using the lens sheet 20A according to an embodiment of the present invention generates no sidelobes as illustrated in FIG. 12. Note that the view-angle characteristics illustrated in FIG. 12 demonstrate view-angle characteristics of the lens array 20A in which:

the trapezoidal prism array 21A has the apex angle of 90 degrees;

the triangular prism array 22A has the apex angle of 90 degrees; and the percentage of each of the trapezoidal and triangular prism arrays 21A and 22A in the surface area of the lens sheet 20A is set to 50%.

Thus, there is no need to locate a diffusive optical sheet between the lens sheet 20A and the image display device 2, making it possible to achieve higher luminance characteristics and eliminate additional optical sheets.

Adjustment of the percentage of each of the trapezoidal and triangular prism arrays 21A and 22A in the surface area of the lens sheet 20A permits the vertical visual field of the screen and the horizontal visual field thereof to be adjusted. The lenses of one array in the first lens array 21 and the second lens array 22 extend in a direction substantially orthogonal to the optical axis L of the light source 6; it therefore has a function of controlling the horizontal visual field of the screen. As described above, the image display 1, as typified by TV, is preferably designed to have the wider horizontal visual field of the screen in comparison to the vertical visual field thereof. Thus, the percentage of the lens array, whose lenses extend in a direction orthogonal to the optical axis L of the light source 6, in the surface area of the lens sheet 20A is preferably set to be equal to or lower than 50%. On the other hand, the lower the percentage of the lens array, whose lenses extend in the direction orthogonal to the optical axis L of the light source 6, in the surface area of the lens sheet 20A is, the more the effect of increasing luminance of the illuminating device 3 is reduced. This is because the lens array has a function of deflecting light transferred obliquely from the light guide member 7 toward the viewer's side F. Thus, the percentage of the lens array, whose lenses extend in the direction orthogonal to the optical axis L of the light source 6, in the surface area of the lens sheet 20A is preferably set to be higher than at least 20%. To sum up, the percentage of one of the first and second lens arrays 21A and 22A in the surface area of the lens sheet 20A is preferably set to be within the range form 20% to 50% inclusive; the one of the first and second lens arrays 21A and 22A extends in the direction orthogonal to the optical axis L of the light source 6. Adjustment of the area percentage of each of the first and second lens arrays 21A and 22A provides the illuminating device 3 that ensures sufficient characteristics of the horizontal view angle of the screen while increasing luminance at the viewer's side F.

Another function of the lens sheet 20 having two-directional prism-lens functions according to an embodiment of the present invention will be described hereinafter.

Figure 16A:
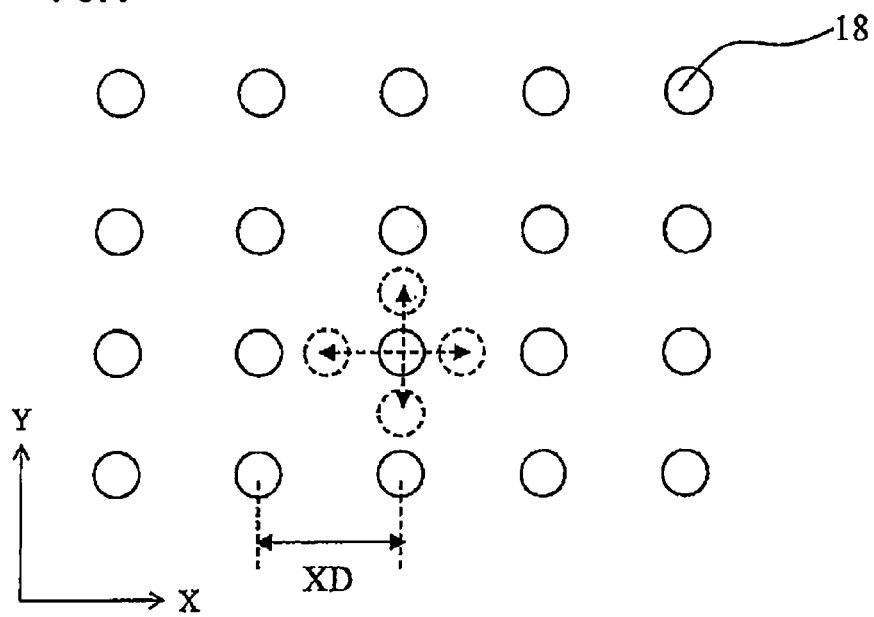
FIG. 16A is a view illustrating an example of the arrangement of light deflection elements according to an embodiment of the present invention.
Figure 16B:
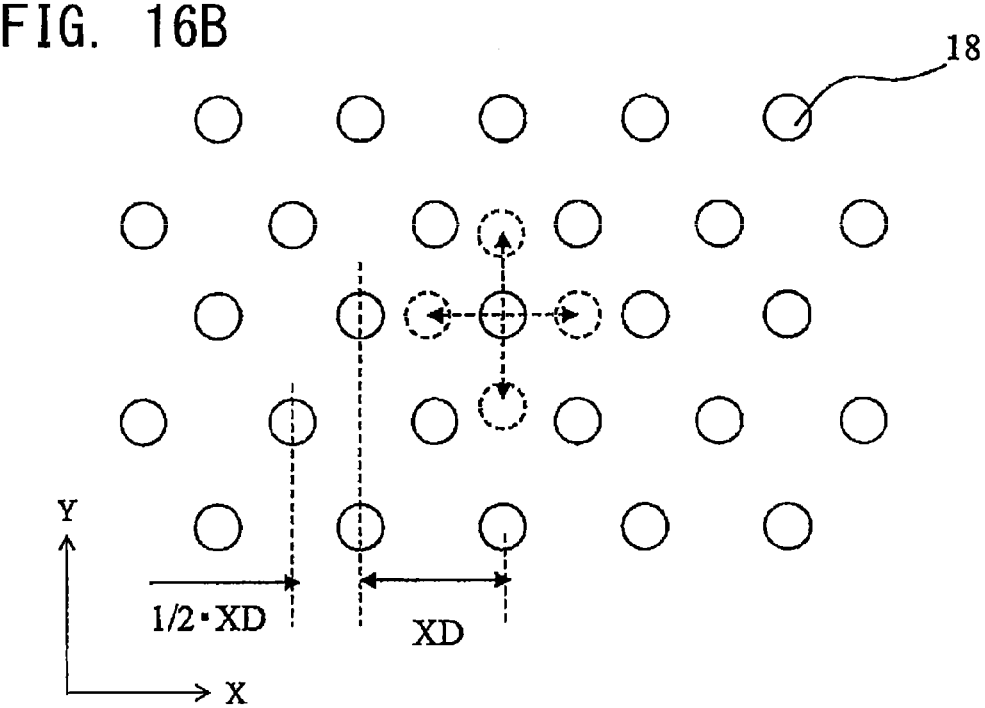
FIG. 16B is a view illustrating another example of the arrangement of the light deflection elements according to an embodiment of the present invention.

FIGS. 16A and 16B illustrate the arrangement of the light deflection elements 18 formed on the light deflection surface 7a of the light guide member 7 according to an embodiment of the present invention. The light deflection elements 18 are arranged at a substantially constant first interval, i.e. first interval, XD in the X direction orthogonal to the optical axis. In other words, when these light deflection elements aligned at the interval XD are viewed as forming one row, the rows are preferably arranged in the Y direction while the rows are shifted by (½)·XD in the X direction (see FIG. 16B); (½)·XD represents the half of the first interval XD. (½)·XD will be referred to as a second interval.

Specifically, the light deflection elements are constructed such that multiple dot-rows, each formed of dots aligned at the first interval in the X direction, are arranged in the Y direction, and adjacent dot-rows are shifted from each other by the second interval in the X direction; the second interval is the half of the first interval. In the Y direction, adjacent dot-rows are preferably arranged at a substantially constant interval, or preferably arranged such that, the farther away from the incident surface 7L, i.e. the light source, the intervals of the adjacent dot-rows are, the narrower the corresponding intervals of them are.

The light deflection elements 18 can be arranged on divided blocks of the light deflection surface 7a in the Y direction. In each block, the intervals in the X direction are preferably set to be regular intervals. In each block, it is preferable that, the farther away from the incident surface 7L, i.e. the light source, the intervals in the Y direction are, the narrower the corresponding intervals are.

The illuminating device 3 preferably has a structure where the light deflecting elements 18 are not visibly identified. When the light deflecting elements 18 are viewed via the lens sheet 20 according to an embodiment of the present invention, a light deflecting element 18 is split into four elements because of the two-directional prism-lens functions.

FIG. 16A illustrates rows of light deflecting elements are arranged in the Y direction while not being shifted in the X direction. FIG. 16B illustrates rows of light deflecting elements are arranged in the Y direction while the rows are shifted by (½)·XD in the X direction.

FIG. 16A demonstrates that one light deflection element is split into an upper element, a lower element, a right element, and a left element, but there are no images, i.e. dashed circles in FIG. 16A, of the one light deflection element in oblique directions of the one light deflection element. In contrast, FIG. 16B demonstrates that one light deflection element is split into an upper element, a lower element, a right element, and a left element, and there are images, i.e. dashed circles in FIG. 16B, of the one light deflection element uniformly in the surface because there are other light deflection elements in the oblique directions of the one light deflection element. This makes it possible to greatly reduce the visibility of each light deflection element 18.

Other embodiments of the lens sheet 20 having the two-directional prism-lens functions will be described hereinafter.

Figure 7:
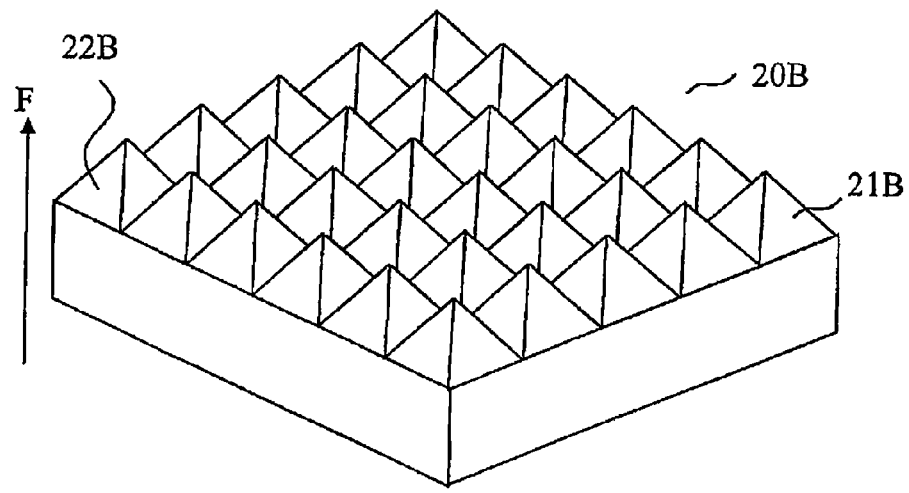
FIG. 7 is a perspective view of a lens sheet according to another embodiment of the present invention.

FIG. 7 illustrates a pyramid lens sheet 20B having the two-directional prism-lens functions. The pyramid lens sheet 20B has a function of collecting light to the direction of the optical axis L of the light source 6, and a function of collecting light to a direction orthogonal to the direction of the optical axis L. Thus, the pyramid lens sheet 20B is desirable because it has:

a function of deflecting light, which is transferred from the light guide member 7 and inclined with respect to the direction of the optical axis L, toward the viewer's side F; and a function of narrowing the vertical visual field of the screen to thereby increase luminance at the viewer's side F.

Adjustment of the apex angle of a first lens array 21B of the pyramid lens sheet 20B and the apex angle of a second lens array 22B permits the view-angle characteristics of the pyramid lens sheet 20B to be adjusted. For example, setting the apex angle of the first lens array 21B of the pyramid lens sheet 20B and the apex angle of the second lens array 22B to be different from each other changes the vertical view-angle characteristics of the screen.

Figure 8:
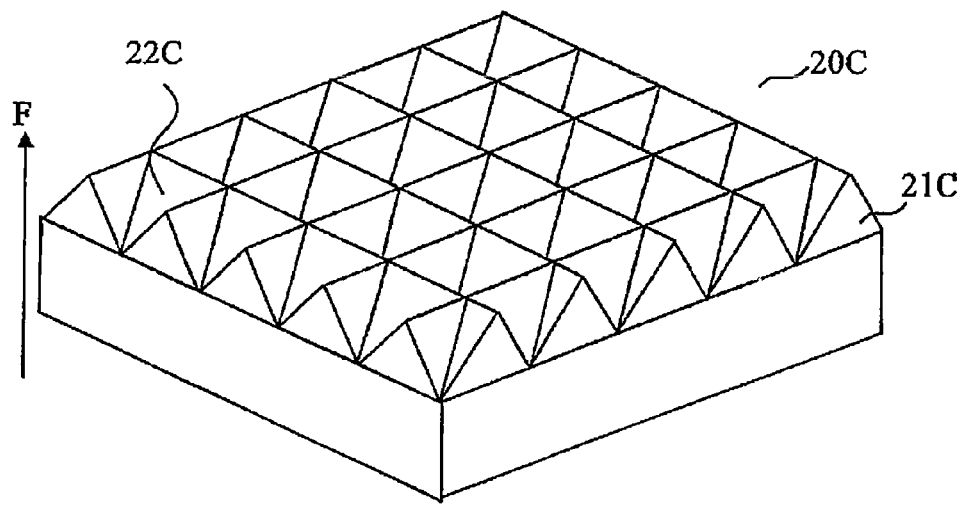
FIG. 8 is a perspective view of a lens sheet according to a further embodiment of the present invention.

An inverted pyramid lens sheet 20C illustrated in FIG. 8 has negative portions and positive portions, i.e. concavities and convexities, that are inverted in shape from concavities and convexities of the pyramid lens 20B set forth above. Specifically, the inverted pyramid lens sheet 20C is comprised of a first lens array 21C and a second lens array 22C. Because the inverted pyramid lens sheet 20C has optical characteristics that are substantially the same as those of the pyramid lens sheet 20B, it is possible to properly select one of the pyramid lens sheet 20B and the inverted pyramid lens sheet 20C.

Figure 9:
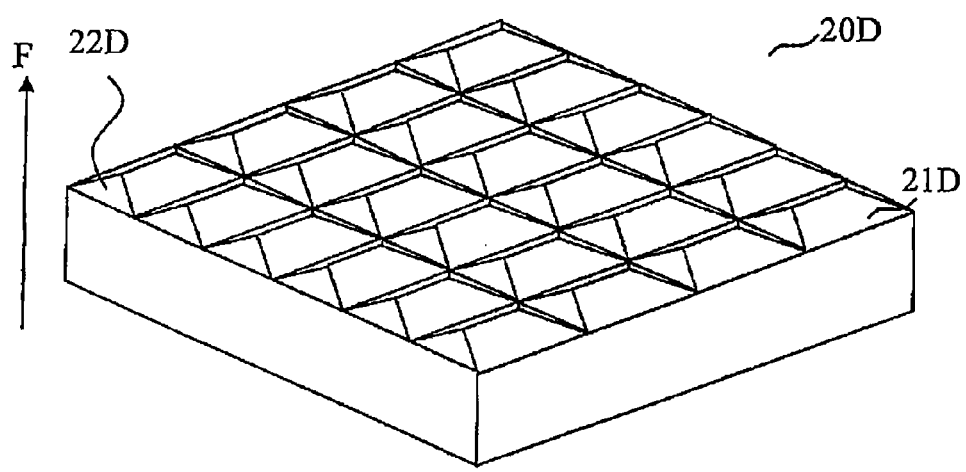
FIG. 9 is a perspective view of a lens sheet according to a still further embodiment of the present invention.

FIG. 9 illustrates a hip-roof (hipped roof) lens sheet 20D. As described above, changing the two-directional apex angles of each of the pyramid lens sheet 20B and the inverted pyramid lens sheet 20C is required for changing the two-directional view-angle characteristics. In contrast, adjustment of the percentage of each of first and second lens arrays 21D and 22D in the surface area of the hip-roof lens sheet 20D permits the two-directional view-angle characteristics to be adjusted without changing the two-directional apex angles.

Figure 10:
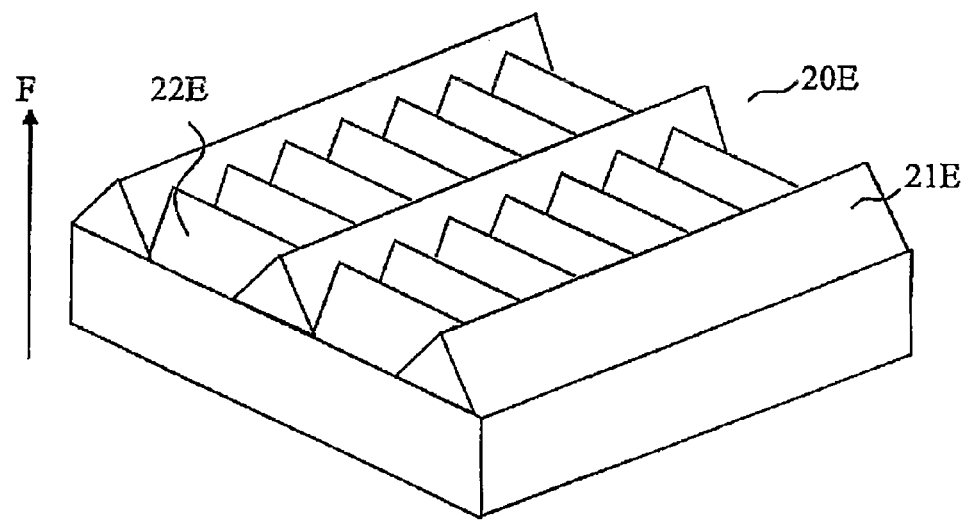
FIG. 10 is a perspective view of a lens sheet according to a still further embodiment of the present invention.

FIG. 10 illustrates a cross prism sheet 20E. The cross prism sheet 20E is comprised of a first lens array 21E, i.e. a first array 21E of lenses, and a second lens array 22E, i.e. a second array 22E of lenses. The lenses of the first array 21E are located with spaces therebetween, and the lenses of the second array 22E are located to fill each of the spaces. The cross prism sheet 20E is specially structured such that the lenses of the second array 22E are smaller in size than those of the first array 21E, and each lens of the first array 21E and each lens of the second array 22E have an independent prism shape. The configuration of the cross prism sheet 20E is different from the configurations of the pyramid lens sheet 20B, the inverted pyramid lens sheet 20C, and the hip-roof lens sheet 20D illustrated in respective FIGS. 7 to 9.

Each lens of the first array 21E and each lens of the second array 22E have an independent prism shape. For this reason, adjustment of the size or the apex angle of each of the first and second lens arrays 21E and 22E, or the spaces between the lenses of the first array 21E permits control of the two-directional view-angle characteristics. A lens sheet 20 illustrated in each of FIGS. 7 to 9 has a common top and a common bottom. For this reason, there is a need to prepare molds for forming two-directional prisms; the molds must be completely in agreement with each other. Thus, if the molds for forming the two-directional prisms were mismatched with each other, there might be adverse effects on the light characteristics, and thread-like unevenness in appearance that might be visibly recognizable.

In contrast, the cross prism sheet 20E illustrated in FIG. 10 is comprised of the first lens array 21E and the second lens array 22E, and the lenses of the first lens array 21E are different in size than those of the second lens array 22E. For this reason, there might be no problems in appearance if molds for forming two-dimensional prisms for the cross prism sheet 20E illustrated in FIG. 10 were mismatched with each other.

The light deflection elements 18 are formed on the light deflection surface 7a of the light guide member 7 provided in the illuminating device 3 according to an embodiment of the present invention. The diffusion sheet 8 can be located between the light guide member 7 and the lens sheet 20 in order to prevent the light deflection elements 18 from being visibly recognized by viewers. In this case, as the diffusion sheet 8, a surface diffusion sheet 8 having an emission surface, on which concavities and convexities for diffusing light are formed, is preferably used. As such a diffusion sheet 8, there are two types of diffusion sheets. The first type, i.e. surface diffusion type, of diffusion sheets has formed on its emission surface concavities and convexities for diffusing light. The second type, i.e. internal diffusion type, of diffusion sheets has included therein a diffusion member. The surface diffusion sheet 8 has a function of emitting obliquely incident light while diffusing it, and a function of slightly deflecting the obliquely incident light toward the viewer's side F. Thus, a diffusion sheet 8 of the surface diffusion type is capable of better improving luminance of the illuminating device 3 than that of the internal diffusion type.

As the surface diffusion sheet 8, a diffusion sheet 8A on which diffusion beads are coated or a microlens sheet 8B on which substantially hemispherical microlenses are regularly or irregularly disposed can be used. The microlens sheet 8B has a function, which deflects obliquely incident light toward the viewer's side F, stronger than the same function of the diffusion sheet 8A. This results in the microlens sheet 8B superior in luminance of the illuminating device 3 to the diffusion sheet 8A, but inferior in hiding capability thereto. Thus, it is desirable to select one of the aforementioned types of diffusion sheets in consideration of the type of the light deflection elements 18. Adding a quantity of diffusion material into the microlens sheet 8B permits the hiding capability of the light deflection elements 18 to be increased.

As the light deflection elements 18 formed on the light deflection surface 7a of the light guide member 7 provided in the illuminating device 3 according to an embodiment of the present invention, white diffuse-reflection dots 18A or concaved or convexed microdots 18B can be used. Particularly, the microdots 18B can be preferably used as the light deflection elements 18. The microdots 18B can better control the angle of emission of output light in comparison to the diffuse-reflection dots 18A. Specifically, it is possible to control light transferred from the light guide member 7 such that the light is incident to the lens sheet 20 at an angle that permits the light to be most efficiently deflected to the viewer's side F.

Here, when one of the light sources 6 located with respect to one incident end surface 7L is only lit, an oblique peak angle at which luminance of incident light to the lens sheet 20 has a peak value will be referred to as θi, and the peak value is set to 100%.

At that time, let us consider each of a higher angular difference ΔD and a lower angular difference Δd relative to the oblique peak angle θi; at each of the higher angular difference ΔD and the lower angular difference Δd, luminance falls down to 80%.

In this consideration, it is desirable that a prism apex angle θ of one of the first lens array 21 and the second lens array 22, which extends in a direction substantially matching with the extending direction of the incident end surface 7L, meets the following formula (1):

$$\text{Tan}^{-1}\{n^*\sin(A)\} - \Delta d \le \theta i \le \text{Tan}^{-1}\{n^*\sin(A)\} + \Delta D \quad (1)$$

where n represents the refractive index of the lens sheet 20; and $$A = \frac{\pi - \theta}{2} - \sin^{-1}\left(\frac{\sin\theta}{n}\right) \quad (2)$$

Figures 13, 14:
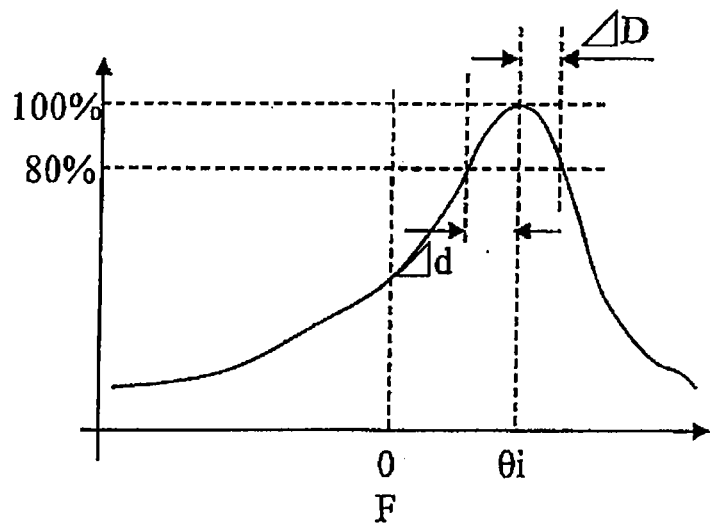
FIG. 13 is a view illustrating light incident into a lens sheet.
FIG. 14 is a table showing results of examples and comparative examples.

FIG. 13 shows the relationship between the peak angle θi, and the angular differences ΔD and Δd. The formula (1) is a relational expression between the incident angle θi and the prism apex angle θ that deflects light incident at the incident angle θi toward the viewer's side F. Light incident to the lens sheet 20 is not collimated light but light having a spread angle, i.e. an angular spread width. For this reason, even if the peak angle θi of incident light does not completely match with the prism apex angle θ, the incident light can be effectively deflected toward the viewer's side F as long as it is within the angular spread width. Thus, as the range of the angular difference, an angle range having an upper limit and a lower limit, at each of which the peak value 100% of luminance falls down to 80%, is defined.

It is desirable that incident light meets the equation (1) because the incident light meeting the equation (1) can be efficiently deflected toward the viewer's side F so that the illuminating device 3 provides higher luminance at the viewer's side F. In addition to increase of luminance, reduction of reflection of light by the lens sheet 3 results in improvement of the illuminating device 3.

Otherwise, if the equation (1) is not satisfied, an increase of light deflected obliquely in comparison to light deflected toward the viewer's side F limits an increase of luminance at the viewer's side F. In addition an increase of reflection of light by the lens sheet 20 results in reduction of the efficiency of the illuminating device 3.

Figure 15:
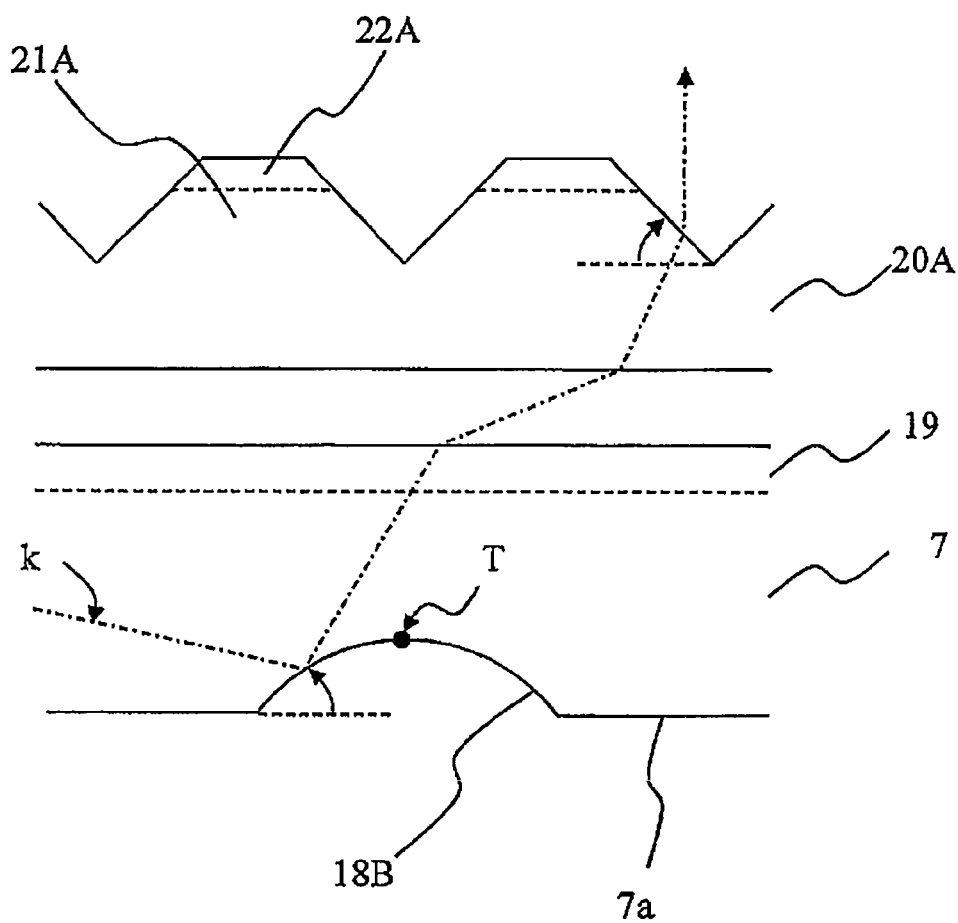
FIG. 15 is a view illustrating the structure of a light guide member 7 according to an embodiment of the present invention and that of the lens sheet illustrated in FIG. 6.

Next, the relationship between the light deflection elements 18 meeting the equation (1) and the lens sheet 20 will be described in more detail. As described above, as the light deflection elements 18, concave or convex microdots 18B are preferably used. A cross section of a microdot 18B, which is orthogonal to the light deflection surface 7a and parallel to the direction of the optical axis, is composed of a top T farthest from the light deflection surface 7a, and two outlines from the top T to the light deflection surface 7a. An average inclination angle of an outline with respect to the light deflection surface 7a is preferably set to be smaller than an average inclination angle of one of the lens arrays of the lens sheet 20 with respect to the light deflection surface 7a. FIG. 15 illustrates, as an example, the light guide member 7 structured by the concave microdots 18B according to an embodiment of the present invention, and the lens sheet 20A illustrated in FIG. 6. In FIG. 15, there is no illustration of the surface diffusion sheet 8 for the sake of simpler illustration.

A microdot 18B has a concave microlens, and formed of a spherical surface from the top T to the light deflection surface 7a. The lens sheet 20A includes, as one of the lens arrays, the trapezoidal lens array 21A, which is orthogonal to the optical axis and has a linear inclination. When an apex angle of a trapezoidal lens array is set to θ, an inclination angle of the trapezoidal lens array is set to (π−θ)/2. At that time, an average value, i.e. an average inclination angle, of angles of tangent lines at respective points on the spherical surface of the cross section of a microdot 18B with respect to the light deflection surface 7a is preferably set to be smaller than (π−θ)/2. If the inclination angle was set to be larger than (π−θ)/2, the peak angle θi given by the equation (1) could be reduced, so that it could not meet the equation (1). Specifically, microdots 18B each having an average inclination angle equal to or smaller than (π−θ)/2 meet the equation (1), so that these microdots 18B are preferably used as the light deflection elements 18. FIG. 15 illustrates, as an example, concave microdots 18B, but the present invention is not limited thereto. For example, convex microdots can be used, or microdots, each of which do not have curved outlines but linear outlines from the top T to the light deflection surface 7a, can be used.

The illuminating device 3 according to an embodiment of the present invention achieves a most efficient luminance-improvement effect when:

the light source 6 is located with respect to each of the right and left sides of the light guide member 7 when viewed from the viewer's side F, which serves as the incident end surface 7L thereof, or the light source 6 is located with respect to at least one of the right and left sides of the light guide member 7 when viewed from the viewer's side F.

As described above, in recent scanning backlights for 3D, the illuminating device 3 is divided into multiple illuminating devices 3 in the vertical direction of the screen according to scanning of video images. Turning on and turning out of the illuminating devices 3 are successively scrolled from the top thereof corresponding to the top of the screen to the bottom thereof corresponding to the bottom of the screen. Thus, it is desired that light incident into the light guide member 7 from the light source(s) 6 should be guided to each divided region. However, light output from the light source(s) 6 is Lambertian light, so that light incident into the light guide member 7 is guided thereinside in the form of a fan.

Thus, a light confinement lens 19 is preferably formed on the light output surface 7b. The light confinement lens 19 preferably has a concave or convex spherical shape, an aspherical shape, or a polygonal prism shape. The extending direction of the light confinement lens 19 is substantially coincident with that of the optical axis L of the light source 6. The expression that the extending direction of the light confinement lens 19 is substantially coincident with that of the optical axis L means that the angle between the optical axis L and the extending direction of the light confinement lens 19 is within the range of 0 degrees plus or minus 10 degrees. If the angle between the optical axis L and the extending direction of the light confinement lens 19 was larger than 10 degrees, a divided block could be visually recognized by a viewer as an oblique one during scanning operations based on backlight. The light confinement lenses 19 are densely arranged in the extending direction of the incident surface or are arranged at constant intervals leaving a gap therebetween in the extending direction.

Particularly, the light confinement lens 19 preferably has convex lenticular lenses. In this case, because the lenses have a curved end surface, the light confinement lens 19 has a resistance to friction of the diffusion sheet 8 or the lens sheet 20 located at the side of the light output surface 7b of the light guide member 7.

The lens sheet 20 constituting the illuminating device 3 according to an embodiment of the present invention generates no sidelobes, there are no diffusion sheets on the lens sheet 20. However, if there were moire-interference fringes between the pixel structure of the image display device 2 and the first or second lens sheet 21 or 22 of the lens sheet 20, a diffusion sheet 28 having a low diffusion function could be located for reducing the moire-interference fringes. The diffusion sheet 28 preferably has a Haze of 80% or less, and transmission of 80% or higher.

If the diffusion sheet 28 had a value of the Haze greater than 80%, light deflected toward the viewer's side F could be diffused by the lens sheet 20, resulting in reduction of luminance. If the diffusion sheet 28 had a value of the transmission lower than 80%, the efficiency of the illuminating device 3 could be reduced. The diffusion sheet 28 can have a polarization split function, which serves as a polarization split reflection sheet 29.

As the image display device 2, a device for passing or blocking light for each pixel to thereby display images can be used. Devices each for passing or blocking light for each pixel make it possible to efficiently use light whose luminance at the viewer's side F is improved by the illuminating device 3 according to an embodiment of the present invention, thus displaying images with high quality.

As the image display device 2, a liquid crystal display can be preferably used. Liquid crystal displays are typical devices for passing or blocking light for each pixel, and they therefore can more improve qualities of images and reduce their manufacturing cost as compared with another type of display devices.

The illuminating device 3 and the display 1 according to an embodiment of the present invention have been described, but the illuminating device 3 according to the embodiment of the present invention is not limited to be applied to the display 1. Specifically, the illuminating device 3, which has a function of efficiently collecting light transferred from the light source 6, can be used for lighting units. That is, based on combination of the optical axis L of the light source(s) 6 and the lens arrays constituting the lens sheet 20, the illuminating device 3 having a higher efficiency for light utilization is provided.

EXAMPLES

As a 23-inch illuminating device 3, the following configuration is used.

Each of Illuminating devices 3 according to examples is designed as a stack comprised of, in sequence from bottom, the reflection sheet 5, the light guide member 7, the microlens sheet 8B, and the lens sheet 20. The reflection sheet 5 is a white diffusion-reflection sheet 5 having the reflection rate of substantially 98%. The microlens sheet 8B is designed such that hemispherical microlenses made from UV cured resin are randomly arranged on a PET substrate. As the light sources 6, white LEDs are located with respect to one side of the light guide member 7. Each of the examples based on the aforementioned configuration and comparative examples will be described in detail.

First Example

As the light guide member 7 of an illuminating device 3 according to the first example, a printed light guide plate 7A having printed white diffuse-reflection dots A as the light deflection elements 18 is used. As the lens sheet 20, a lens with the shape of the lens sheet 10A illustrated in FIG. 6 was molded using as a material a polycarbonate resin having a refractive index of substantially 1.59. As the first lens array 21, the trapezoidal prisms of the array 21A are located to be parallel to the optical axes L of the light sources 6. The triangular prisms of the array 22A are orthogonal to the light axes of the light sources 6. The percentage of the triangular prism array 22A in the surface area of the lens sheet 20A is set to 40%. The apex angle of each of the trapezoidal prism array 21A and the triangular prism array 22A is set to 90 degrees.

Second Example

As the light guide member 7 of an illuminating device 3 according to the second example, a shaped light guide plate 7B having concaved microdots 18B as the light deflection elements 18 is used. Each concaved microdot 18B has a part of an oval ellipsoidal shape, a longitudinal width of 200 μm, another width of 100 μm, and a dot height of 20 μm. The light confinement lens 19 is formed on the light output surface 7b of the shaped light guide plate 7B. The light confinement lens has a width of 150 μm, and a height of 52 μm. The lens sheet 20 used in the second example is identical to the lens sheet 20A used in the first example.

First Comparative Example

As the light guide member 7 of an illuminating device 3 according to a first comparative example, the printed light guide plate 7A is used like the first example. As the lens sheet 20, polycarbonate resin was molded to form the prism sheet 30 illustrated in FIG. 4. The prism sheet 30 is located such that the extending direction of the prism lenses is parallel to the optical axes of the light sources 6. The prism lenses have an apex angle of 90 degrees.

Second Comparative Example

As the light guide member 7 of an illuminating device 3 according to a second comparative example, the printed light guide plate 7A is used like the first example. As the lens sheet 20, polycarbonate resin was molded to form the prism sheet 30 illustrated in FIG. 4. The prism sheet 30 is located such that the extending direction of the prism lenses is orthogonal to the optical axes of the light sources 6. The prism lenses have an apex angle of 90 degrees.

A liquid crystal panel is located as the image display device 2 at the viewer's side F of each of the illuminating devices 3 according to the first example, second example, first comparative example, and second comparative example, thus providing the display 1 for each of the illuminating devices 3 according to the first example, second example, first comparative example, and second comparative example. Evaluations of front luminance and optical appearance for each of the illuminating devices 3 according to the first example, second example, first comparative example, and second comparative example were carried out. The evaluation results are shown in FIG. 14.

The display according to the first comparative example is comprised of the most commonly structured illuminating device 3 made up of: the printed light guide 7A, the microlens sheet 8B, and the prism sheet 30. The first comparative example resulted in sidelobes due to the prism sheet 30. In order to reduce these sidelobes, it is necessary to locate an additional diffusion sheet at the viewer's side of the prism sheet 30.

The display 1 according to the first example achieves luminance higher than luminance achieved by the display according to the first comparative example. The prism sheet 30 according to the first comparative example is structured such that the extending direction of the prism lenses is parallel to the optical axes of the light sources 6. For this reason, it is difficult for the prism sheet 30 according to the first comparative example to deflect output light inclined with respect to the horizontal direction.

In contrast, the lens sheet 20A according to the first example is structured such that the triangular prisms of the array 22A extend in a direction orthogonal to the optical axes L. This configuration makes it possible to deflect oblique light output from the light guide member 7 toward the viewer's side F. The percentage of the triangular prism array 22A in the surface area of the lens sheet 20A is set to 40%, and that of the trapezoidal prism array 21A in the surface area of the lens sheet 20A is set to 60%. This results in more advanced light-collection function in the horizontal direction of the screen in comparison to light-collection function in the vertical direction of the screen. Thus, the view angle in the horizontal direction is larger than that in the vertical direction, providing the display 1 with well-balanced horizontal and vertical view angles.

The micro-structured shaped light guide plate 7B comprised of the concave microdots 18B as the light deflecting element 18 is used in the second example. This makes it possible for the display 1 according to the second example to achieve luminance higher than luminance achieved by the display according to the first example. That is, the second example is different from the first example in the use of the micro-structured shaped light guide plate 7B as the light guide member 7 in place of the printed light guide plate 7A. Using the micro-structured shaped light guide plate 7B having the light output surface 7b on which the light confinement lens 19 is formed makes it possible to provide the display 1 having luminance higher by 10% than the display 1 using the printed light guide plate 7A. A peak angle of light, which is output from the micro-structured shaped light guide plate 7B and the microlens sheet 8B and incident into the lens sheet 20A is substantially 30 degrees that meets the equation (1). Thus, the second example provides the display 1 having higher luminance.

The second comparative example provides the display 1 having luminance higher than that of the display 1 according to each of the first example and the first comparative example. In the second comparative example, because the prism lenses constituting the prism sheet 30 extend in a direction orthogonal to the optical axes L, it is possible to efficiently deflect light output obliquely with respect to the optical axes L toward the viewer's side F.

However, the prism sheet 30 according to the second comparative example collects light in the horizontal direction of the screen. For this reason, the display 1 according to the second comparative example has a narrower visual field in the horizontal direction of the screen and a wider visual field in the vertical direction thereof. This resulted in a problem in the view-angle characteristics thereof, and sidelobes due to the prism sheet 30 were determined.

These examples determine that the lens sheet 20 having a first array of prisms in one direction and a second array of prisms in another direction makes it possible to provide: the illuminating device 3 having higher luminance and no sidelobes; and the display 1 equipped with the illuminating device 3 in comparison to the prism sheet 30 having an array of prisms in one direction.

Recent large liquid crystal TV, flat display panels, and the like mainly use one of a direct illuminating device and an edge-light illuminating device. Such a direct illuminating device is equipped with, as light sources, multiple cold cathode fluorescent lamps or LEDs (Light Emitting Diodes) arranged regularly behind a panel. A diffuser, which has high light-scattering, is located between an image display device, such as a liquid crystal panel, and the light sources. This prevents the cold cathode fluorescent lamps or LEDs as the light sources from being visibly recognized.

On the other hand, an edge-light illuminating device is equipped with cold cathode fluorescent lamps or LEDs arranged at an edge surface of a light translucent plate, referred to as a light guide plate. On one surface, referred to as a light deflection surface, of the light guide plate, which is opposite to an output surface thereof facing the image display device, light deflection elements are formed. The light deflection elements efficiently guide light incident from the edge surface of the light guide plate to the output surface.

To improve the video quality of liquid crystal displays, reduce crosstalk in 3D videos based on active systems, and provide illuminating devices with higher luminance, there may be a light guide plate including a lenticular lens or a prism lens located at its output surface to provide a scanning backlight.

In this case, because image data should be scanned from top to bottom of the screen, LEDs point light sources are used. The LEDs are located on a right or left side, or on both right and left sides of the screen. For this reason, the intensity distribution of light emitted from the light guide plate shows that the intensity peaks are higher not at the normal but at an obliquely direction on to the horizontal line. Particularly, if the LEDs are located on a right or left side of the screen, the visual field of the right side of the screen and that of the left side thereof are greatly different from each other.

Illuminating devices may be designed such that one or more optical sheets are assembled on the output surface of a light guide plate. The one or more optical sheets assembled on the output surface of the light guide plate hide the light deflection elements formed on the light deflection surface of the light guide plate, and deflect and collect light emitted from the light guide plate to the direction of a viewer. Particularly, prism sheets may be used to deflect light emitted obliquely from the light guide plate to the direction of a viewer to collect the light to the direction of the viewer.

Prism sheets are optical sheets on which triangular prism lenses extending in one direction are arranged, so that the collection of light is achieved in the one direction. Thus, if LEDs are located on a right or left side, or on both right and left sides of the light guide plate, a prism sheet, having triangular prism lenses extend in the vertical direction of the screen, is required in order to deflect light having an oblique peak in the horizontal direction of the screen to the direction of a viewer. However, if such a prism sheet having prism lenses extend in the vertical direction of the screen is used, the corresponding image display might result in displaying images having a wider vertical visual field of the screen and a narrower horizontal visual field thereof. Such an image display would be undesirable because image displays are required to have a wide horizontal visual field.

One approach may be to further assemble, on the light guide plate, a prism sheet having prism lenses extending in the horizontal direction of the screen in order to address the problem. This approach also collects light in the vertical direction of the screen. This approach narrows the vertical visual field, but makes the horizontal visual field unchanged. In addition, an increase of the number of assembled optical sheets may result in reduction of the efficiency of the illuminating device, and in additional cost.

Thus, a prism sheet, which has prism lenses extending in the horizontal direction of the screen, is usually assembled on the light guide plate even if LEDs are located on both right and left sides of the light guide plate. However, as described above, prism sheets, which have prism lenses extending in the horizontal direction of the screen, have no function of deflecting high-intensity oblique light emitted from the light guide plate in the horizontal direction to the direction of a viewer. In order to address it, there can be used two or more diffusion sheets for example. In this case, two diffusion sheets are disposed for example between the light guide plate and the prism sheet. As another example, one diffusion sheet is disposed between the light guide plate and the prism sheet, and one diffusion sheet is also disposed between the prism sheet and the display panel.

A diffusion sheet is operative to hide the light deflection elements formed on the light deflection surface of the light guide plate, and slightly collect light to the direction of a viewer. For this reason, assemblage of two or more diffusion sheets makes it possible to slightly deflect light output obliquely from the light guide plate to the direction of the viewer.

However, in an illuminating device equipped with LEDs located on a right or left side, or on both right and left sides of the light guide plate, and an assembled prism sheet having prism lenses extending in the horizontal direction of the screen, the light output from the light guide plate may not be effectively deflected to the direction of a viewer, resulting in the illuminating device with low luminance.

An illuminating device according to an embodiment of the present invention is equipped with a light source located on one right or left side or both the right and left sides of a light guide plate, and the illuminating device is comprised of a lens sheet capable of efficiently deflecting light output from the light guide plate to the direction of a viewer without additional optical sheets while preventing the horizontal visual field of the screen from being extremely narrowed. A display equipped with the illuminating device is also provided.

An illuminating device according to a first aspect of the present invention includes a translucent light guide member having a first major surface, a second major surface opposite to the first major surface, and four side end surfaces connecting the first major surface and the second major surface, and a lens sheet assembled on the light guide member. The lens sheet includes a translucent base; a first array of lenses mounted with respect to one surface of the base, the lenses of the first array extending in one direction; and a second array of lenses mounted with respect to the one surface of the base. The lenses of the second array extend in another direction intersecting the lenses of the first array. The illuminating device includes multiple light sources; and a light deflection element formed on the first major surface and formed to deflect light being guided in the light guide member toward the second major surface. One of the four side end surfaces or each of opposing two side end surfaces of the four side end surfaces serves as an incident surface into which light output from the multiple light sources is incident. The multiple light sources are located to face the incident surface while the multiple light sources are arranged in parallel to an extending direction of the incident surface. The multiple light sources each have an optical axis that is substantially in agreement with a normal direction of the incident surface. A percentage of a selected one of the first array of the lenses or the second array of the lenses in a surface area of the lens sheet is set to be within a range from 20% to 50% inclusive. Extending directions of the lenses of the selected one of the first array or the second array are substantially orthogonal to the optical axis of each light source.

In the illuminating device according to the first aspect of the present invention, the lenses of the first array are trapezoidal lenses having an apex angle from 70 to 110 degrees inclusive. The lenses of the second array are triangular prism lenses having height lower than height of the trapezoidal lenses. The triangular prism lenses have an apex angle from 70 to 110 degrees inclusive. The triangular prism lenses are mounted on the trapezoidal prism lenses such that an intersection angle between the triangular prism lenses and the trapezoidal prism lenses is within a range of 90 degrees plus or minus 10 degrees. The tops of the trapezoidal prism lenses are common with the tops of the corresponding triangular prism lenses.

In the illuminating device according to the first aspect of the present invention, the lenses of the first array are located with spaces therebetween. The lenses of the first array are first triangular prism lenses having an apex angle from 70 to 110 degrees inclusive. The lenses of the second array are second triangular prism lenses having height lower than height of the first trapezoidal prism lenses. The second triangular prism lenses have an apex angle from 70 to 110 degrees inclusive. The second triangular prism lenses are arranged between the first triangular prism lenses such that an intersection angle of the second triangular prism lenses with respect to the first triangular prism lenses is within a range of 90 degrees plus or minus 10 degrees. The first triangular prism lenses are flush with the bottoms of the corresponding second triangular prism lenses.

The illuminating device according to the first aspect of the present invention further includes a diffusion sheet having an output surface and located between the lens sheet and the light guide member. The diffusion sheet is designed as a surface diffusion sheet having the output surface on which concavities and convexities are formed.

In the illuminating device according to the first aspect of the present invention, diffusion beads are coated on the output surface.

In the illuminating device according to the first aspect of the present invention, substantially hemispherical microlenses are formed on the output surface.

In the illuminating device according to the first aspect of the present invention, an oblique peak angle at which luminance of incident light to the lens sheet 20 has a peak value is referred to as θi when one of the multiple light sources located for the incident surface is only lit. A higher angular difference relative to the oblique peak angle θi at which luminance falls down to 80% is referred to as ΔD when the peak value is set to 100%. A lower angular difference Δd relative to the oblique peak angle θi at which luminance falls down to 80% is referred to as Δd when the peak value is set to 100%. An apex angle θ of the selected one of the first array or the second array meets the following equation (1):

$$\text{Tan}^{-1}\{n^*\sin(A)\} - \Delta d \leq \theta i \leq \text{Tan}^{-1}\{n^*\sin(A)\} + \Delta D \quad (1)$$

where:
n represents the refractive index of the lens sheet 20; and $$A = \frac{\pi - \theta}{2} - \sin^{-1}\left(\frac{\sin\theta}{n}\right) \quad (2)$$

In the illuminating device according to the first aspect of the present invention, the light deflection element includes multiple dot-rows, each of which is composed of dots aligned at first intervals in a direction orthogonal to the direction of the optical axis, and the multiple dot-rows are arranged in the direction of the optical axis. Adjacent dot-rows are shifted from each other by second intervals in the direction orthogonal to the direction of the optical axis, the second interval being a half of the first interval. In the direction of the optical axis, adjacent dot-rows are arranged at regular intervals, or arranged such that, the farther away from the incident surface the intervals of the adjacent dot-rows are, the narrower the corresponding intervals of the adjacent dot-rows are.

The illuminating device according to the first aspect of the present invention further includes a light confinement lens formed on the second major surface of the light guide member and extending in a direction parallel to the direction of the optical axis of each light source. The light confinement lens are formed to limit a passage of the light guided in the light guide member.

In the illuminating device according to the first aspect of the present invention, the light confinement lens has a convex or concave spherical cylindrical shape, an aspherical cylindrical shape, or a polygonal prism shape. The light confinement lens is formed of multiple light confinement lenses. The multiple light confinement lenses are densely arranged in the extending direction of the incident surface or are arranged at constant intervals leaving a gap therebetween in the extending direction.

In the illuminating device according to the first aspect of the present invention, the light deflection element comprises convex or concave dot lenses arranged individually and discretely in the first major surface. The cross section of each of the dot lenses, taken at an orthogonal direction to the first major surface and parallel to the direction of the optical axis, includes a top farthest from the first major surface, and two outlines from the top to the first major surface. An average inclination angle of each of the outlines with respect to the first major surface is set to be smaller than an average inclination angle of the selected one lens of the first array and the second array with respect to the first major surface.

In the illuminating device according to the first aspect of the present invention, a low diffusion sheet having a low diffusion function or a polarization split reflection sheet having a low diffusion function is assembled on the output surface of the lens sheet.

The illuminating device according to the first aspect of the present invention further includes a reflection sheet located at a side of the first major surface of the light guide member.

A display according to a second aspect of the present invention includes an image display device that passes or blocks light for each pixel to thereby define an image to be displayed, and the illuminating device according to the first aspect of the present invention.

In the illuminating devices described above, the lens sheet is assembled at a side of an output surface of the light guide member. The lens sheet includes a first array of lenses mounted with respect to one surface of a base, the lenses of the first array extending in one direction, and a second array of lenses formed with respect to the one surface of the base. The percentage of a selected one of the first array of the lenses or the second array of the lenses in the surface area of the lens sheet is set to be within the range from 20% to 50% inclusive. The extending directions of the lenses of the selected one of the first array or the second array are substantially orthogonal to the optical axis of each light source.

Thus, the illuminating device can achieve higher luminance without causing a horizontal visual field to be significantly narrowed, and a desired display equipped with the illuminating device can be provided.

As used herein the words "a" and "an" and the like carry the meaning of "one or more." The recitation of numerical ranges by endpoints may include all numbers subsumed within that range, inclusive of the endpoints.

Obviously, numerous modifications and variations of the present invention are possible in light of the above teachings. It is therefore to be understood that within the scope of the appended claims, the invention may be practiced otherwise than as specifically described herein.

The invention claimed is:
1. An illuminating device, comprising:
at least one light source configured to output light;
a translucent light guide member having at least one side surface into which the light is incident from the light source and a light output surface through which the light guided in the translucent light guide member is output; and
a lens sheet positioned over the light output surface of the light guide member and comprising a translucent base, a first array of lenses, and a second array of lenses, the first and second arrays of lenses being mounted on the translucent base and extended in directions intersecting each other,
wherein the light source is positioned to have an optical axis substantially in agreement with a normal direction of the side surface of the translucent light guide member, the first and second arrays of the lenses are formed such that one of the first and second arrays of the lenses which is extended in a direction substantially orthogonal to the optical axis of the light source has a surface area in a range of from 20% to 50% with respect to a total surface area of the first and second arrays of the lenses, and
the one of the first and second arrays has an apex angle θ satisfying formula (1):

$$\text{Tan}^{-1}\{n^*\sin(A)\} - \Delta d \leq \theta i \leq \text{Tan}^{-1}\{n^*\sin(A)\} + \Delta D \quad (1)$$

where θi represents a peak angle at which a luminance of a light incident to the lens sheet has a peak value when one light source is lit, ΔD represents a higher angular difference relative to the peak angle θi at which the luminance falls down to 80% when the peak value is set to 100%, Δd represents a lower angular difference relative to the peak angle θi at which the luminance falls down to 80% when the peak value is set to 100%, n represents a refractive index of the lens sheet, and A is represented by following formula (2):

$$A = \frac{\pi - \theta}{2} - \sin^{-1}\left(\frac{\sin\theta}{n}\right). \quad (2)$$

2. The illuminating device according to claim 1, wherein the translucent light guide member includes a light deflection element which is formed on a light deflection surface positioned opposite to the light output surface and configured to deflect the light guided in the light guide member toward the light output surface.

3. The illuminating device according to claim 2, wherein the at least one light source is provided in a plurality, and the plurality of light sources are located to face the side surface and positioned along with a direction in which the side surface is extended.

4. The illuminating device according to claim 2, wherein the light deflection element comprises a plurality of dot-rows positioned along with the optical axis of the light source, each of the dot-rows comprises dots positioned at a first interval in a direction orthogonal to the optical axis, the plurality of dot-rows are positioned such that adjacent dot-rows in a direction of the optical axis are shifted from each other by a second interval in a direction orthogonal to the optical axis, the second interval is a half of the first interval, and the adjacent dot-rows are positioned at a substantially constant interval, or positioned such that an interval of the adjacent dot-rows becomes narrower as the adjacent dot-rows are positioned farther away from the side surface of the translucent light guide member.

5. The illuminating device according to claim 2, wherein the light deflection element comprises convex or concave dot lenses positioned individually and discretely on the light deflection surface, each of the dot lenses has a cross section orthogonal to the light deflection surface and parallel to the optical axis, the cross section has a top portion farthest from the light deflection surface, and two outlines from the top portion toward the light deflection surface, and an average inclination angle of each of the outlines with respect to the light deflection surface is smaller than an average inclination angle of the one of the first and second arrays with respect to the light deflection surface.

6. The illuminating device according to claim 1, wherein the lenses of the first array are trapezoidal lenses having an apex angle from 70 to 110 degrees, the lenses of the second array are triangular prism lenses having a height lower than a height of the trapezoidal lenses, the triangular prism lenses have an apex angle from 70 to 110 degrees and are mounted on the trapezoidal prism lenses such that an intersection angle between the triangular prism lenses and the trapezoidal prism lenses is within a range of 90 degrees±10 degrees, and the trapezoidal prism lenses have top portions corresponding to top portions of the triangular prism lenses.

7. The illuminating device according to claim 1, wherein the lenses of the first array are first triangular prism lenses which have an apex angle from 70 to 110 degrees and are positioned with a space therebetween, the lenses of the second array are second triangular prism lenses having a height lower than height of the first trapezoidal prism lenses and an apex angle from 70 to 110 degrees, the second triangular prism lenses are positioned between the first triangular prism lenses such that an intersection angle of the second triangular prism lenses with respect to the first triangular prism lenses is within a range of 90 degrees±10 degrees, and the first triangular prism lenses correspond to bottom portions of corresponding second triangular prism lenses.

8. The illuminating device according to claim 1, further comprising:
a surface diffusion sheet which is positioned between the lens sheet and the light guide member and has an output surface on which concavities and convexities are formed.

9. The illuminating device according to claim 8, further comprising:
diffusion beads coated on the output surface of the surface diffusion sheet.

10. The illuminating device according to claim 8, further comprising:
microlenses which are substantially hemispherical and formed on the output surface of the surface diffusion sheet.

11. The illuminating device according to claim 1, further comprising:
a light confinement lens formed on the light output surface of the light guide member and extended in a direction parallel to the optical axis of the light source,
wherein the light confinement lens is configured to limit a passage of the light guided in the light guide member.

12. The illuminating device according to claim 11, wherein the light confinement lens has one of a convex or concave spherical cylindrical shape, an aspherical cylindrical shape and a polygonal prism shape, the light confinement lens is provided in a plurality and positioned along with a direction in which the side surface is extended, and the plurality of light confinement lenses are positioned densely or with a substantially constant gap formed therebetween.

13. The illuminating device according to claim 1, wherein the lens sheet has an output surface on which a low diffusion sheet or a polarization split reflection sheet is formed, and the low diffusion sheet and the polarization split reflection sheet have a low diffusion function.

14. The illuminating device according to claim 1, further comprising:
a reflection sheet located on a side of the light deflection surface of the translucent light guide member.

15. A display, comprising:
an image display device configured to display an image by passing or blocking light in each pixel; and
the illuminating device according to claim 1.

16. The display according to claim 15, wherein the translucent light guide member includes a light deflection element which is formed on a light deflection surface positioned opposite to the light output surface and configured to deflect the light guided in the light guide member toward the light output surface.

17. The display according to claim 16, wherein the at least one light source is provided in a plurality, and the plurality of light sources are located to face the side surface and positioned along with a direction in which the side surface is extended.

18. The display according to claim 15, wherein the lenses of the first array are trapezoidal lenses having an apex angle from 70 to 110 degrees, the lenses of the second array are triangular prism lenses having a height lower than a height of the trapezoidal lenses, the triangular prism lenses have an apex angle from 70 to 110 degrees and are mounted on the trapezoidal prism lenses such that an intersection angle between the triangular prism lenses and the trapezoidal prism lenses is within a range of 90 degrees±10 degrees, and the trapezoidal prism lenses have top portions corresponding to top portions of the triangular prism lenses.

19. The display according to claim 15, wherein the lenses of the first array are first triangular prism lenses which have an apex angle from 70 to 110 degrees and are positioned with a space therebetween, the lenses of the second array are second triangular prism lenses having a height lower than height of the first trapezoidal prism lenses and an apex angle from 70 to 110 degrees, the second triangular prism lenses are positioned between the first triangular prism lenses such that an intersection angle of the second triangular prism lenses with respect to the first triangular prism lenses is within a range of 90 degrees±10 degrees, and the first triangular prism lenses correspond to bottom portions of corresponding second triangular prism lenses.

20. The illuminating device according to claim 1, further comprising:
    a light confinement lens formed in contact with the light output surface of the light guide member and extended in a direction parallel to the optical axis of the light source, wherein the light confinement lens is configured to limit a passage of the light guided in the light guide member.

\* \* \* \* \*